Dec. 31, 1968

R. A. O'NEILL 3,419,164

METHOD AND APPARATUS FOR HANDLING AIRCRAFT
PASSENGERS, BAGGAGE AND FREIGHT

Filed Jan. 12, 1966

INVENTOR.
ROBERT A. O'NEILL
BY
*Harvey C. Lockhurst*
ATTORNEY

Fig_3

INVENTOR.
ROBERT A. O'NEILL
BY
ATTORNEY

Fig_16

Fig_14  Fig_15

Fig_13

INVENTOR
ROBERT A. O'NEILL
BY  Harvey C. Lawhurst
ATTORNEY

United States Patent Office 3,419,164
Patented Dec. 31, 1968

3,419,164
METHOD AND APPARATUS FOR HANDLING AIRCRAFT PASSENGERS, BAGGAGE AND FREIGHT
Robert A. O'Neill, 128 Echo St.,
Santa Cruz, Calif. 95060
Filed Jan. 12, 1966, Ser. No. 520,276
11 Claims. (Cl. 214—38)

ABSTRACT OF THE DISCLOSURE

A palletized package member supported by fluid pressure transports passengers and baggage between a terminal and a craft which the passengers are to board. When in position aboard the craft, the fluid pressure is released and the package member forms the seats in the craft, with the passengers therein. The package members are transported between the terminal and the craft on a transport vehicle whose body portion is movable in an arc-like motion to mate with different levels of openings in the terminal and on the craft.

---

This invention relates in general to methods and apparatus for handling airplane cargo, and relates more particularly to methods and apparatus for handling airplane passengers, baggage and freight so as to facilitate their loading and unloading between airplane and terminal.

It is well known to most people today, and particularly to air travelers themselves, that the technological advances represented by modern day jet aircraft have not been matched by corresponding advances in the handling of passengers and baggage between the terminal and the aircraft. Thus, even though today's aircraft are capable of carrying a large number of passengers at great speeds and in considerable comfort, with food, beverages and entertainment readily available, there is still a great deal of delay, inconvenience and even annoyance involved in getting one's self and baggage to and from such aircraft. This condition exists even though almost all communities which are serviced by large jet aircraft have made enormous investments in expanded airport terminal facilities in an effort to adequately accommodate the increasing number of people who are availing themselves of the convenience and speed of present commercial air service.

It is primarily the size of the modern jet aircraft itself which has caused the majority of the problems and inconveniences present in commercial flying today. The modern jet is necessarily very large, with a large wing span and long fuselage. This large size requires correspondingly large spaces for maneuvering the aircraft between service areas and the terminal, as well as large parking areas at the terminal while loading and unloading. Since most air terminals require the more or less simultaneous loading or unloading of a large number of aircraft, at least during peak traffic hours, the space requirements for the aircraft increase rapidly. It is this aircraft space requirement which has dictated to a large extent the design of most modern commercial air terminals, with their long finger-like ramps extending out toward the different aircraft parking areas. The result of this design is that the entrance to the terminal, at which the passenger arrives for the start of his trip or at the end thereof, is usually an enormous distance from the door of the aircraft involved. Even though many terminals have installed escalators and moving floorways and the like to reduce the passengers' burden and time in traversing these distances, the average airline passenger today still spends a great deal of his time in negotiating long tunnel-like passageways to reach or depart from an aircraft. This situation is particularly aggravated when the passenger has to change planes at a terminal, since it then involves the double trip from the arriving aircraft to the center of the terminal and then a return by another route to the aircraft to be boarded.

Another problem which arises in modern air travel is that of baggage handling. In most modern air terminals, the departing passenger checks in at the appropriate desk in the terminal and surrenders his baggage at that time to the care of the airline. The passenger then proceeds to the boarding area, but is left with no real assurance or confidence that his baggage will be loaded onto the proper aircraft, Similarly, on arrival at his destination, the passenger proceeds from the aircraft to the baggage claiming area of the terminal and waits hopefully for the safe arrival of his baggage. Damage, loss and theft are significant factors undermining passenger goodwill.

Although the above discussion may have emphasized the delays and inconveniences of modern air travel to the passengers, it will be understood that these problems are of vital significance to the airlines themselves from an economic as well as a public relations point of view. For example, the period of time that an aircraft is waiting at a passenger loading area for randomly arriving passengers to appear for boarding is obviously not a revenue producing activity for the airline, and it is clearly in the airline's economic interest to shorten this period as much as possible so as to increase the revenue miles flown in a given period of time. Similarly, the handling of passenger baggage requires a substantial expenditure of time on the part of airline personnel, as well as the investment of a significant amount of money in automated or semi-automated baggage handling equipment.

Heretofore in the prior art, there have been numerous proposals to alleviate some or all of the problems discussed above. For example, U.S. Patent No. 2,885,242, discloses the use of a portable carrier into which passengers can be loaded at the terminal, after which the loaded carrier is transported by a fork lift truck or the like to the waiting aircraft. This solution does eliminate the need for movable bellows-like extensions of the terminal ramps to allow passenger communication between the terminal and the aircraft, but it is not entirely satisfactory in that it does not provide for any true mating to either the terminal or the aircraft since the portable carrier merely rests upon the ground at both the terminal and the aircraft.

In another solution proposed in U.S. Patent No. 2,778,674, there is shown a bus-like member having an upper body portion which can be elevated to position the body to receive passengers from a terminal door. After this loading, the body is lowered and the bus driven to the waiting aircraft, at which time the body is again elevated to mate with the aircraft door to discharge the passengers. This solution eliminates the need for movable extensions of the terminal ramps and, additionally provides for mating with the height of the terminal and aircraft door levels. However, it does not particularly facilitate the assembling of passengers at the terminal for loading or the loading of the passengers into the aircraft, and additionally, it makes no special provision for passenger baggage.

In accordance with the present invention, a completely new approach to the handling of aircraft passengers, baggage and freight is presented, employing a number of novel features. The heart of the present invention involves the use of palletized package members on which passengers, baggage and freight can be loaded in the terminal. These packages are then moved, preferably by a specially designed transfer bus member, to the aircraft to be loaded. The loaded pallet packages are then inserted aboard the aircraft intact and positioned therein in accordance with the particular loading arrangement. The aircraft is then ready for departure, and upon arrival at its destination, the loaded pallets may be removed from the aircraft by a vehicle similar to the one which loaded them. These loaded pallet packages are delivered to the appropriate areas of the terminal for discharge of passengers, baggage and freight.

The palletized packages for passenger use are located for loading in the terminal, in an area closely adjacent to the dock from which they will be picked up by the transfer bus. The passenger packages contain seats similar to or identical with those of a conventional aircraft, since these seats will be occupied by the passengers in the aircraft itself. As the passengers arrive for boarding, they take assigned or selected seats in the passenger package. The size of each passenger package is selected to facilitate the loading of the aircraft, and the required number of such packages is employed to accommodate all of the passengers for that aircraft. As an additional feature of this invention, a palletized baggage package is provided, preferably closely adjacent to the passenger packages, for the loading of the passenger's baggage. Each such baggage package is provided with a number of baggage compartments, preferably with identifications which are keyed to or correspond to the seat numbers available in the passenger packages. Each passenger arriving for boarding, after receiving his seat designation, may thus deposit his baggage in the correspondingly numbered baggage compartment of the baggage package. Since the passenger's baggage is stored closely adjacent to this seat in the passenger package, and preferably within sight thereof, he can be confident of its arrival with him at his destination, while the airlines are relieved of much of the burden and liability for passenger baggage handling.

When all of the passengers are assembled and the aircraft is ready for boarding, the transfer bus arrives at the terminal dock and loads the passenger and baggage packages. The transfer bus is provided with a movable body which can be elevated to the level of the terminal floor to mate with the opening at the terminal dock. The loaded passenger and baggage packages are then moved onto the bus floor. The transfer bus is then driven to the waiting aircraft and the bus body positioned to mate with the opening in the aircraft into which the passenger packages are to be loaded. The passenger packages are loaded aboard the aircraft, with the passengers remaining seated in their assigned places.

In accordance with one particularly important feature of this invention, the packages are supported by fluid pressure, such as air under pressure. This use of fluid pressure has the advantage of permitting controlled support and movement of the packages without requiring the use of heavy or bulky conveyors, rollers or lifts and the like. The use of fluid under pressure has the further advantage of permitting rapid and positive braking of the movement of the packages by release of the fluid pressure.

In accordance with another important feature of the invention, the baggage package is designed with hinged sections which extend to the sides. The shape of the extended baggage package preferably closely matches the cross-sectional configuration of the portion of the aircraft in which the baggage is to be stored. After the baggage is loaded into the package at the terminal, the hinged sections are folded inwardly to form essentially a cube, thus reducing the space needed to load the package aboard the transfer bus. To load aboard the aircraft, the hinged sections are again folded outwardly, and since their shape in this position closely matches the cross-sectional configuration of the aircraft, there is maximum utilization of the space available aboard the aircraft for baggage storage. In the open configuration, the narrow cross section slides easily through the freight door in the side of the fuselage.

It is therefore an object of this invention to provide improved apparatus for transporting aircraft cargo, including passengers, baggage and freight, between the aircraft and a terminal location.

It is further object of the present invention to provide apparatus for transporting cargo to and from an aircraft employing a palletized package onto which the cargo can be loaded, the package serving as the container for the cargo while it is in the aircraft.

It is an additional object of this inventon to provide apparatus for transporting cargo to and from an aircraft employing palletized packages into which the cargo can be loaded, with fluid pressure means to support the packages for the transfer movement.

It is a further object of this invention to provide improved apparatus for simultaneously transporting passengers and their baggage to and from an aircraft.

It is another object of this invention to provide a baggage package for loading passengers' baggage aboard an aircraft and for storing it therein during flight, the package having hinged sections which unfold for loading of the passengers' baggage before the package is aboard the aircraft and which fold inwardly to reduce the size of the package for loading aboard a transfer bus, the shape of the package when the sections are unfolded closely matching the cross-sectional configuration of the aircraft.

It is an additional object of the present invention to provide apparatus for transporting passengers and their baggage to and from an aircraft, in which the passengers and baggage are loaded into adjacent palletized packages and the packages are transported by fluid pressure to a vehicle which carries them to the aircraft, the packages themselves serving as containers for the passengers and baggage when loaded on the aircraft.

It is a further object of this invention to provide an easily transportable package into which passengers waiting to board an aircraft may be loaded and in which the passengers remain after loading of the package on the aircraft.

It is a further object of this invention to provide equipment capable of providing transport service directly between the aircraft and major points in the city.

Further objects and advantages of the present invention will become apparent to those skilled in the art to which the invention pertains as the ensuing description proceeds. The features of novelty that are considered characteristic of this invention are set forth with particularity in the appended claims. The operation of the invention itself will best be understood from the following description when read in connection with the accompanying drawings, in which:

Figure 1:
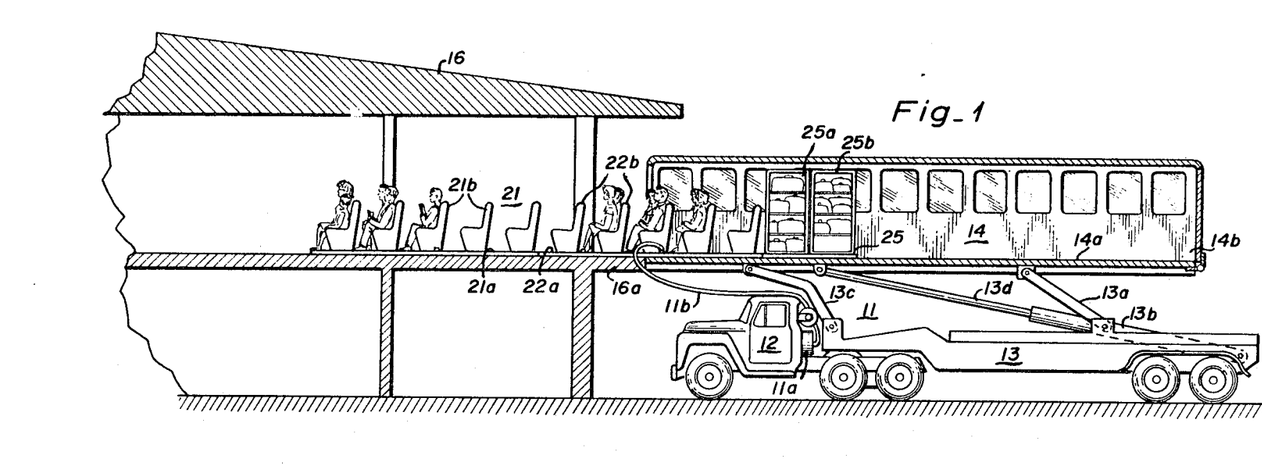
FIGURE 1 is a side view, partly in section, showing the transfer bus of this invention loading palletized passenger and baggage packages from a terminal dock.

Referring to the drawing, FIGURE 1 illustrates the transfer bus in position to load passenger and baggage packages from a terminal. Transfer bus 11 comprises a conventional tractor or cab portion 12 and a trailer portion 13 which carries the platform for supporting the packages and the mechanism for positioning the platform at the proper level for mating with terminal and aircraft openings. This platform may be in the form of a body member 14 having a floor portion 14a and walls 14b for receiving the package from the terminal. The interior of body member 14 is provided with windows and is preferably decorated in a manner similar to that of the interior of an aircraft to provide maximum aesthetic pleasure to the passengers. Body 14 may also be air conditioned to provide maximum comfort for the passengers.

For loading, transfer bus 11 is positioned adjacent to the loading dock 16 of the terminal and body 14 is elevated so that floor 14a is level with the floor 16a of dock 16. This elevation is preferably performed by a scissors-like mechanism which imparts an arcuate motion to body 14. This mechanism may include a pair of rear arms 13a and 13b on trailer 13 and a forward arm 13c. Each of these arms has one end secured to the bottom of body 14, while the other end is pivotally mounted on trailer 13. Arm 13b includes an extendable arm 13d which is controllably movable within arm 13b under operator control. The arms are actuatable by suitable means, such as hydraulic pressure, under the control of the operator in cab 12, to elevate the body to any desired height. In FIGURE 1, body 14 is elevated to the level of loading dock 16, and it will be noted that body 14 has a forward orientation relative to cab 12. This position results from the design and arrangement of arms 13a, 13b, 13c, 13d, and is quite valuable in providing flexibility of positioning of body 14 to accommodate a variety of terminal dock and aircraft heights. It further permits these buses to mate to each other permitting more rapid loading and unloading.

Two passenger packages 21, 22 are shown in FIGURE 1, as well as a baggage package 25. Each passenger package includes a floor frame portion, such as frame portion 21a for package 21. This frame portion is preferably provided with suitable means therein for conducting fluid under pressure to support the package, as will be described more in detail below. Each of the passenger packages also is provided with a plurality of seats, such as seats 21b, 22b, for the passengers to be loaded. These seats preferably are similar to or identical with conventional aircraft seats, and are provided with seat belts, etc., for the passengers' safety and convenience.

Each of the passenger packages is of a suitable length and width to facilitate its loading into the aircraft. In the embodiment shown, each package contains five rows of three seats abreast and this appears to be a convenient size for most large jet aircraft, but this size may be varied to fit the requirements of the particular aircraft. For purposes of loading onto the transfer bus from the terminal dock, as shown in FIGURE 1, the packages may be mechanically joined or coupled together in a train fashion.

Like the passenger packages, baggage package 25 has a frame portion 25a which includes means for permitting pressure fluid to flow therethrough to support the package.

The pressure fluid to lift the passenger and baggage packages is preferably compressed air which is supplied from transfer bus 11. Bus 11 may include an air compressor 11a driven by the bus engine, providing the air volume which is controllably supplied to the packages through flexible hose 11b. Hose 11b may be connected to the frame of one of the packages, in a manner to be described below, and fluid pressure supplied thereto to pneumatically lift the package from the floor for movement into the body 14 of the transfer bus.

Prior to the arrival of the transfer bus at the loading dock, the passenger and baggage packages are disposed in terminal 16, and as the passengers arrive for boarding, they are assigned seats in a designated one of the passenger packages. After this assignment, they deposit their luggage in a specified compartment of a baggage package, which is disposed closely adjacent the passenger package. The particular compartment preferably has a number corresponding to the assigned seat number, to aid in locating the baggage. The passengers then take their assigned seats in the passenger package, and when all passengers are assembled or when the flight is ready for boarding, transfer bus 11 arrives at the door of the terminal dock to take on the loaded packages.

Figure 11:
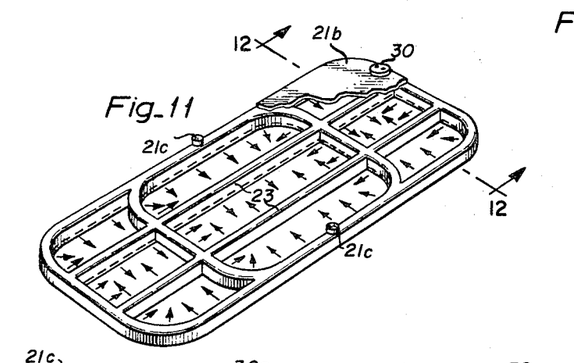
FIGURE 11 is a perspective view of the frame of a passenger or baggage package, illustrating the pressure fluid flow which supports it during motion.
Figure 12:
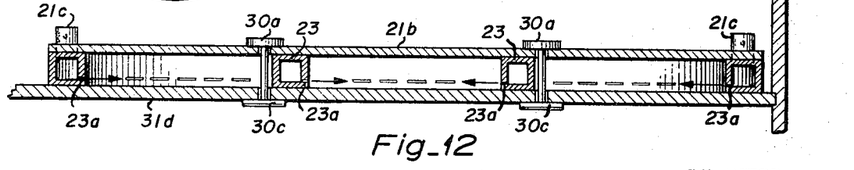
FIGURE 12 is an enlarged cross-sectional view taken along lines 12—12 of FIGURE 11 further illustrating the construction and fluid pressure distribution through the package frame.

The details of the pressure fluid flow through the frame of one of the packages to support it are shown in FIGURES 11 and 12. Frame 21a comprises a plurality of conduit members 23 to which the pressure fluid, such as air, is supplied through couplings 21c. Conduit members 23 are provided with a plurality of spaced openings 23a (FIGURE 12) through which the air flows to exert a lifting force on the package. Frame 21a may be provided with a top cover 21b overlying conduits 23 so that the air escaping through openings 23a exerts a lifting force on this cover against the floor of the terminal, or the transfer bus, or the aircraft floor 31d as shown in FIGURE 12.

A number of openings 23a are provided, as indicated by the arrows showing air flow in FIGURE 11, so that a balanced lifting force is applied to the package when air is supplied to conduits 23. After being lifted from the floor, the packages are ready to begin their movement onto the transfer bus. To provide maximum safety for the passengers, each package may be provided with extendable arms (not shown) which are located just above floor level and which can be extended to establish and maintain a wall clearance of approximately six inches between the passenger package and any adjacent walls.

The slight thrust needed to propel the passenger package aboard the bus may be provided manually by a crew member, or preferably by a small battery-powered booster operated by a crew member to tow the passenger package into position. In this connection, it will be appreciated that a platform supported on an air film has a very low coefficient of friction, so that very little force is required to move the package across the generally level surfaces of the terminal, the transfer bus and the aircraft.

Figure 2:
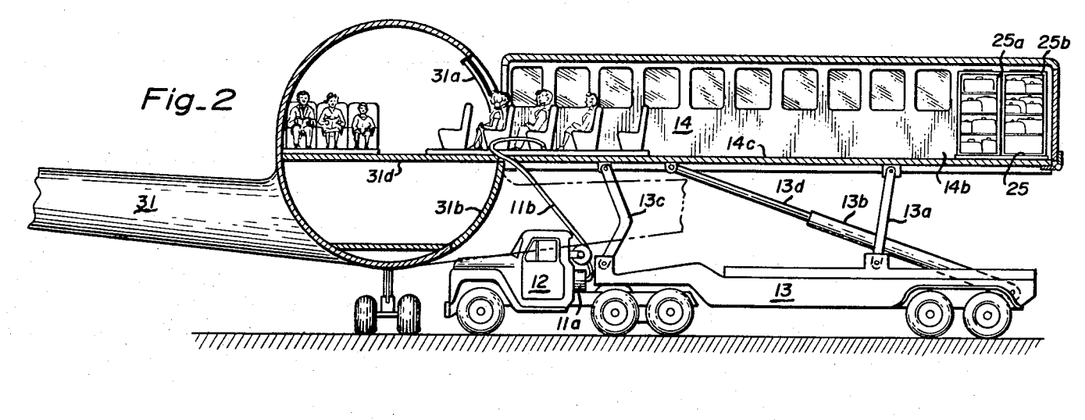
FIGURE 2 is a side view, partly in section, showing the transfer bus of this invention loading the passenger and baggage packages aboard an aircraft.
Figure 3:
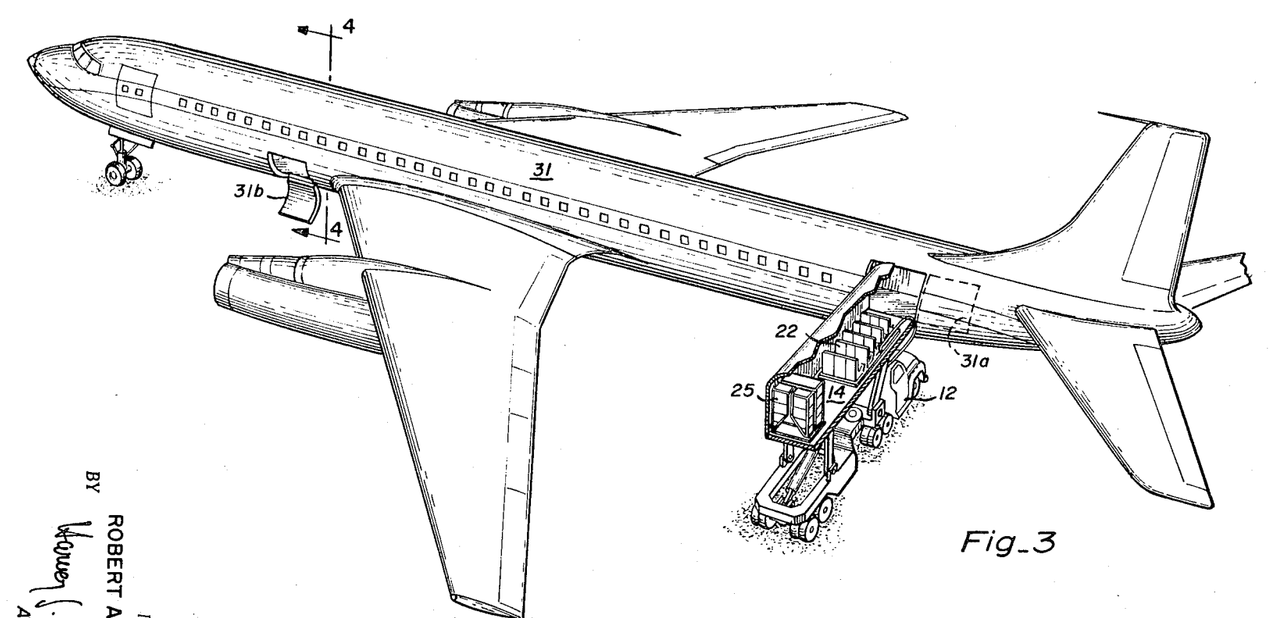
FIGURE 3 is a perspective view illustrating the elevation of the body of the transfer bus to mate with an aircraft door for loading of passenger packages.

After loading of the passenger and baggage packages, the transfer bus then drives across the apron to the waiting aircraft. As shown in FIGURES 2 and 3, the aircraft 31 may be provided with a side loading door 31a to which the transfer bus is driven. Platform 14 is then positioned by means of arms 13a, 13b, 13c and 13d to the proper level to mate with this opening. Air is supplied from supply 11a through hose 11b to the frame of the first package to be loaded, to lift it slightly from floor 14a of body 14 and it is moved into the aircraft. As best shown by the phantom outline of the passenger packages 21', 22' in FIGURE 9, the length of the passenger packages is chosen so that they can be easily turned within the aircraft when loaded therein from the side, as in FIGURES 2 and 3.

When the passenger packages enter the fuselage of the airplane, suitable guides placed in floor sockets may be used to cause the package to make the 90-degree turn and head down the length of the fuselage, guided away from the wall by the above-described clearance arms. When the package reaches the desired position along the longitudinal axis of the aircraft, the clearance arms are retracted and the packages may be pushed against the wall.

Figures 9, 10:
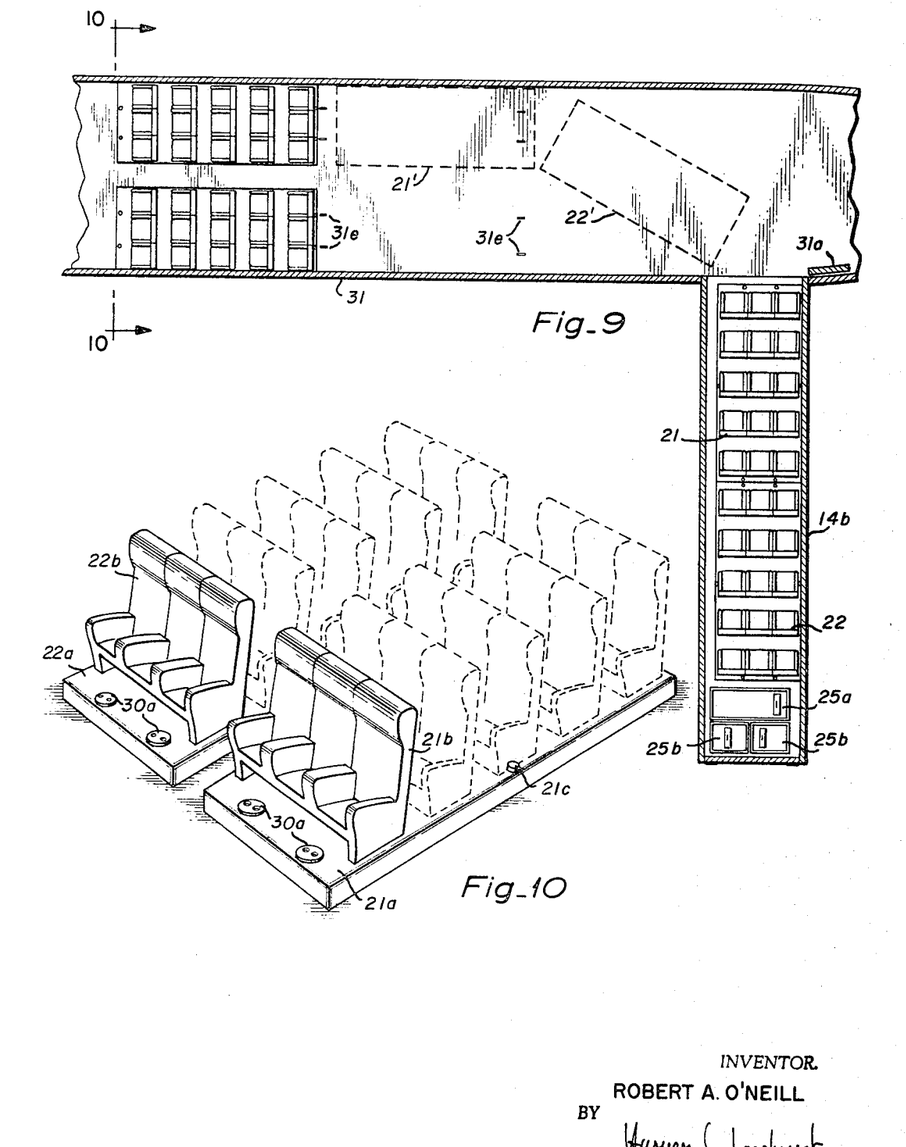
FIGURE 9 is a plan view illustrating the movement of passenger packages aboard an aircraft from a transfer bus of the configuration of FIGURE 5 serving points in the heart of the city.
FIGURE 10 is an enlarged perspective view taken along lines 10—10 of FIGURE 9 showing the movement and guiding of the passenger packages within the aircraft when loading.

As seen in FIGURE 10, the packages result in a seating arrangement identical with that of a conventional jet aircraft, with two sets of three seats abreast separated by an aisle.

After each passenger package is properly positioned in the aircraft passenger cabin, the air supply thereto from hose 11b is shut off, thus causing the package to drop the slight distance to the aircraft floor. This results in positive braking of the package and causes the package to be firmly anchored to the aircraft floor by its own weight. Articulating corners of adjoining packages and interconnecting them with air hoses permits moving them in the same manner as a train.

Figures 13, 14, 15:
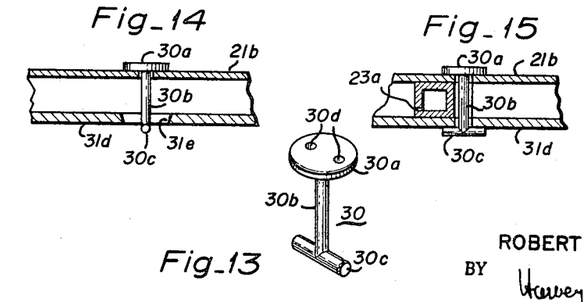
FIGURE 13 is a perspective view of a locking member which may be employed to lock the package member to the aircraft.
FIGURE 14 shows a portion of the package frame member and illustrates the operation of the locking means of FIGURE 13 to lock the package into position aboard the aircraft.
FIGURE 15 further illustrates the operation of the locking means of FIGURE 13.
Figure 16:
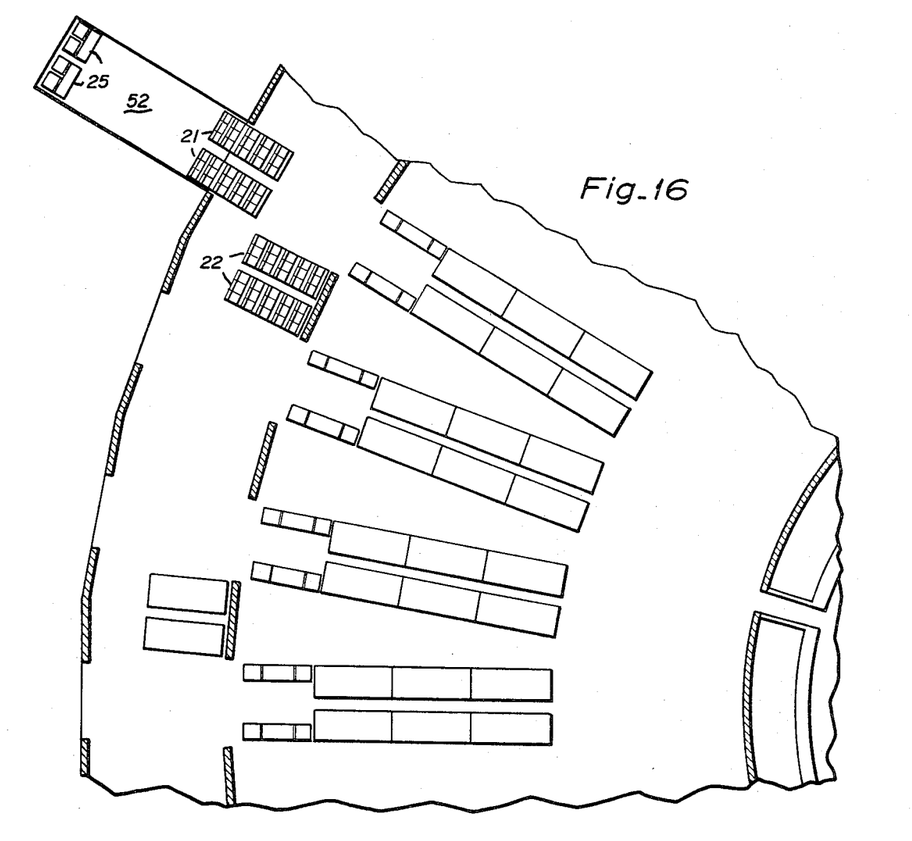
FIGURE 16 is a plan view of a terminal building illustrating the disposition of packages therein for loading aboard the transfer bus of this invention.

After the passenger packages have been positioned within the aircraft and the air supply shut off, locking means such as shown in detail in FIGURES 13, 14 and 15 are employed to firmly lock the packages in position. As shown in FIGURE 13, the locking means may be in the form of a locking pin 30 having a locking head 30a connected through a shaft 30b to a shank 30c. Locking pin 30 may be rotated by insertion of a suitable tool in openings 30d in head 30a. Locking pin 30 extends through an opening in top cover 21b of the passenger package and fits through an elongated opening 31e (FIGURE 14) in aircraft floor 31d when the package is properly positioned. After being inserted through opening 31e, the locking pin may be rotated by suitable wrench means (not shown) engaging head 30a through openings 30d. Rotation of shank 30c to the position shown in FIGURES 14 and 15 effectively locks the passenger package to the aircraft floor. In this connection, the fit of locking pin 30 is made sufficiently snug in the locked position so as to prevent accidental rotation of the pin which might unlock the package from the floor.

Figure 4:
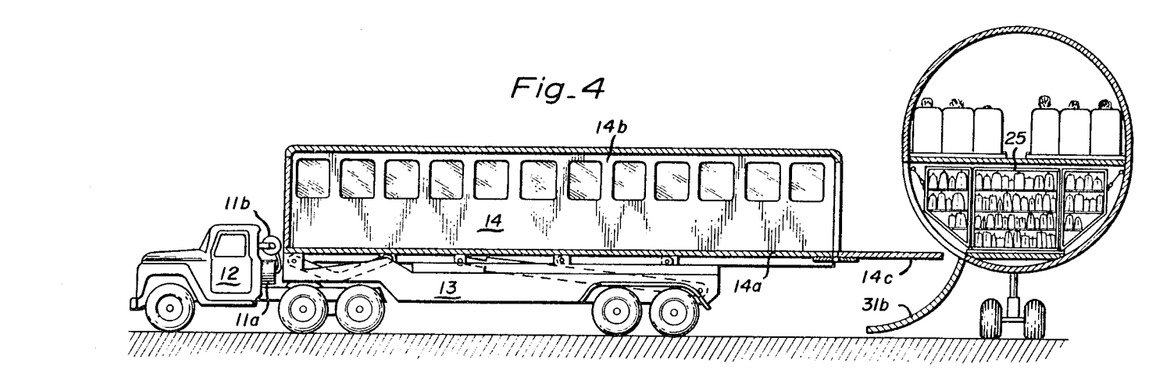
FIGURE 4 is a side view showing the transfer bus of this invention in position for receiving baggage packages and illustrating the disposition of passenger and baggage packages respectively above and below the mid-section floor of the airplane fuselage.

In the service of large airplanes there will normally be several buses loaded with passengers and a separate bus will bring the baggage and proceed directly with the baggage loading operation. As shown in FIGURES 3 and 4, aircraft 31 may be provided with a door 31b for loading cargo and baggage. Transfer bus 11 proceeds to this door, and platform 14 is positioned to the proper level (FIGURE 4) to mate therewith for baggage loading. The back or rear door 14c of transfer bus 14 preferably drops down, as clearly shown in FIGURE 4, to provide a floor or tailgate which extends under the curve of the aircraft fuselage. This forms a ramp across which the baggage packages can be moved into the baggage section of the aircraft. Air hose 11b is connected to the first baggage package to be loaded and air supplied thereto to lift the baggage package for movement into the aircraft, in a manner similar to that described above for the passenger packages.

Figure 7:
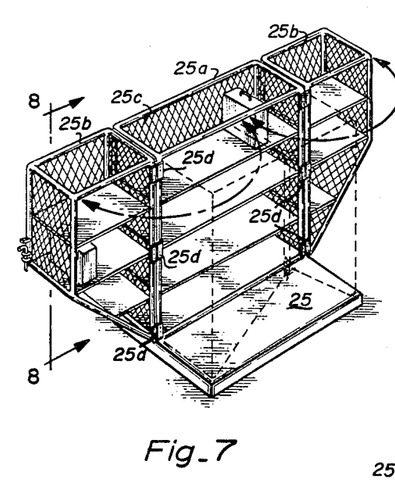
FIGURE 7 is a perspective view of one embodiment of a baggage package in accordance with this invention showing the hinged section in extended position.
Figure 8:
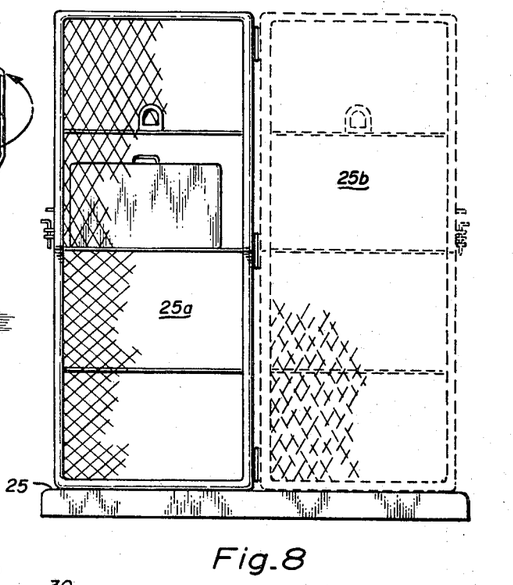
FIGURE 8 is an enlarged view of the baggage package taken along lines 8—8 of FIGURE 7, showing the hinging action of the package with the hinged sections illustrated in dotted lines in folded position.

In their preferred form, the baggage packages are of a novel design which facilitates their loading into the transfer bus and the aircraft. As best shown in FIGURES 7 and 8, a baggage package 25 comprises a center section 25a and a pair of side sections 25b. Each of these sections contains a plurality of shelves which form compartments as shown to provide for storage of passengers' luggage. The sections are provided on three sides with a protective mesh 25c, leaving the fourth side open for insertion and removal of baggage.

Side sections 25b are hinged to center section 25a by hinge means 25d so that the side sections can be folded in the direction of the arrows of FIGURE 7 to form essentially a cube. This reduces the size of the package and greatly facilitates insertion of the baggage package into the transfer bus. It may serve as a more desirable state for use on the terminal dock. When the baggage packages are in the terminal to receive passengers' baggage, they may be in the position shown in FIGURE 7, with sections 25b extended. After the package has been filled with baggage, side sections 25b are folded forward to form a cube, as seen in FIGURES 3 and 8, and the package is ready for loading into the transfer bus. The baggage package is carried in this folded form in the transfer bus, as indicated in FIGURES 1, 2 and 3. The package is opened up and slid sideways into the airplane cargo door, as shown in FIGURE 4. It will be seen from FIGURE 4 that the stepped shoulders on side sections 25b cause the baggage package to closely conform to the contour of the aircraft fuselage in the baggage area, thus resulting in maximum utilization of baggage space within the aircraft.

Once inside the cargo door the baggage package is moved down the longitudinal axis of the airplane. The cargo hold would accept a given number of baggage packages to occupy the available space.

The baggage package of this invention thus is in an extended position for loading into the airplane and can be folded into a more compressed configuration for all other usage. It can be folded out again for use in the terminal if desired, along a wall, for example. This results in maximum ease of handling of the package, combined with maximum utilization of available space in the aircraft.

After the baggage packages have been loaded aboard, transfer bus 11 withdraws and the aircraft is ready for departure. Upon arrival at its destination, the above-described procedure is essentially reversed to withdraw the passenger and baggage packages from the aircraft. The arriving aircraft is met by a transfer bus, or buses, 11, and after elevation of platform 14 to the desired level to match the aircraft opening, hose 11b is connected to the first package to be unloaded. Supplying of air to the frame of this package results in lifting it slightly from the floor, and it is drawn by the electric booster toward the opening into the transfer bus. By linking up other packages as a train, they can be jointly drawn into the transfer bus, the movement of the passenger packages being as shown in FIGURE 9.

From a practical standpoint, it is probably desirable that the baggage packages be withdrawn from the aricraft by a separate bus or truck, so that the passengers will not be required to sit in the transfer bus while the baggage packages are being removed from the aircraft. In any event, after both the passenger and baggage packages are aboard the transfer bus, or buses, they proceed to the terminal loading dock, and after positioning platform 14 to the proper level, proceed to discharge the packages into the terminal. This operation is also performed using air flotation of the packages to lift them for movement to the terminal floor.

After the passenger packages are positioned in the terminal, the air supply thereto is shut off, causing the packages to settle firmly to the floor. The passengers may then disembark from their seats and secure their baggage from the nearby baggage packages and proceed on their way.

If required, a mobile booster embodying an air compressor may be utilized as an air supply for supporting the packages within the terminal, if it is desired not to use hoses 11b from truck 11 in these areas.

Figure 5:
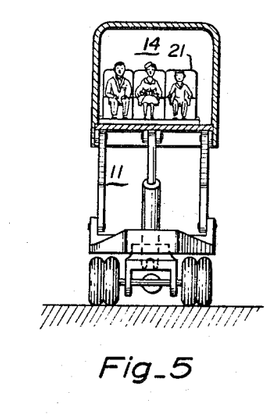
FIGURE 5 illustrates one embodiment of the transfer bus of this invention designed to conform with laws governing highway operation and permitting direct transfer of passengers between the airplane on the flight line and metropolitan centers.
Figure 6:
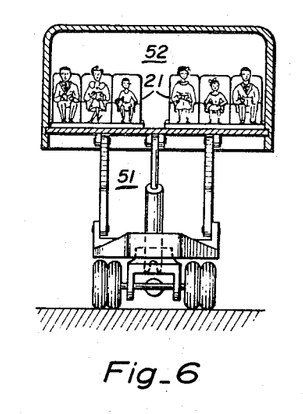
FIGURE 6 illustrates another embodiment of the transfer bus for use between the airplane on the flight line and the airport terminal, the bus body being as wide as the airplane fuselage since there are no width limitations on the bus when traveling on the flight line.

In the above description, it was assumed that the aircraft was to be loaded through a side door, and under these circumstances the passenger packages were inserted into the aircraft in units of three seats abreast. However, where aircraft are available with hinged openings at either or both ends, a greater width is available for passenger loading so that a greater number of passenger packages can be introduced at one time. With this type of aircraft, a transfer truck 51 as shown in FIGURES 6 and 15 may be employed. Truck 51 has a width in its platform 52 sufficient to accommodate two passenger packages 21 side by side, as contrasted with the single package width of the transfer truck 11 shown in FIGURE 5. Transfer truck 51 may thus proceed to the front or rear hinged opening of an aircraft and simultaneously load or unload passenger packages side by side, thus reducing the time required to load a given number of passenger packages and passengers aboard the aircraft.

It will be apparent that there are many advantages to the palletized and air-supported package of the present invention. For example, where different classes of accommodations are to be made available on a given flight, such as first class and tourist, the use of the passenger packages of the present invention permits great flexibility in the number of seats to be assigned to each section. That is, the basic packages can be made available at the terminal, as described above, made up as first class or tourist class, and used as the demand occurs. Thus, if there are a larger number of tourist passengers than anticipated for a given flight and fewer first class passengers, additional tourist class passenger packages in the terminal can be brought to that dock with a minimum of trouble. Hence, each aircraft load may be made up according to demand, allowing great flexibility to the airlines and not requiring the separation of the aircraft into fixed numbers of seats for different classes of passengers, as is now the practice.

Additionally, the palletized packages can be employed for other than passengers and baggage. It will be apparent that this technique may also be used for food and bathroom units by mounting them on packages which are movable into and out of the aircraft in a manner similar to that described above for the passenger and baggage units. This would represent a substantial savings to the airlines because the units could be removed from the aircraft for servicing between trips, thus avoiding tying up the aircraft while they are being serviced. When an aircraft arrives at a terminal, the passenger, food, baggage and bathroom units can be removed as described above, and fresh units put aboard for the next trip. The removed units, after discharging passengers and baggage, can be taken away for service and returned for a subsequent flight. The aircraft need only spend time on the ground for refuelling and whatever mechanical service may be required, thus eliminating the time-consuming cleaning of aircraft cabins and the servicing of food and bathroom facilities which account for such a large part of the turn-around time for present day aircraft.

As a further feature of this invention, freight may also be loaded on packages interchangeable with those described above. The freight may be placed on packages at an air freight terminal and be ready for loading when space is available aboard an aircraft. If a flight has fewer passengers than the aircraft capacity, the additional space may be filled with freight packages, and by suitable screening between the area of the aircraft containing passenger packages and that containing the freight packages, none of the amenities of the passenger's flight are affected, while the airline is able to utilize the aircraft to full capacity. By placing the freight on the freight packages in advance, they can be quickly loaded aboard when it is established that the aircraft will not have a full load of passengers. The pallet dimensions of the freight packages' fluid flotation characteristics would be identical to their counterparts, the passenger packages.

The freight package concept can also be utilized, of course, when loading an aircraft which is carrying only freight, but its maximum value would appear to be in combining freight packages with passenger packages on aircraft which have less than a capacity load of passengers, as described above.

While the above detailed description has shown, described and pointed out the fundamental novel features of the invention as applied to various embodiments, it well be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. Apparatus for loading passengers aboard an aircraft from a terminal, comprising:
    a palletized package member in the terminal having seats thereon for the seating of passengers, said seats being an integral part of said package member;
    said package member having a frame portion on the bottom thereof including conduit means for receiving a pressure fluid;
    said conduit means having a plurality of openings therein through which said pressure fluid may escape to exert a lifting force on said package member;
    means for supplying a pressure fluid to said conduit means to lift said package member and the passengers thereon from the floor of the terminal;
    transport means for receiving said package member with the passengers seated thereon from the terminal and for moving said package member and the passengers from the terminal to the aircraft; and
    means for controlling said pressure fluid to lift said package member from said transport means and for positioning said package member and the passengers thereon in a normal seating position aboard the aircraft, said pressure fluid being released when said package member and the passengers are in said normal seating position in the aircraft.

2. Apparatus in accordance with claim 1 including a baggage-receiving package member, said baggage-receiving member having conduit means with openings therein for escape of said pressure fluid to exert a lifting force on said package member, said baggage-receiving member being positioned in said terminal adjacent said passenger-carrying package member for the storage of passengers' baggage; and
    means for supplying pressure fluid to said conduit means in said baggage-receiving package member.

3. An apparatus in accordance with claim 1 in which said transport means includes a transfer bus having a body portion which can be elevated to the height of the terminal in an arc-like motion to receive the loaded package member and which can be positioned in an arc-like motion at a door of the aircraft to discharge the package member and passengers into the aircraft.

4. Apparatus in accordance with claim 3 in which said transport means includes a plurality of said transfer buses, the body portions of said buses being elevatable and alignable with each other longitudinally of said body portions to form a continuous tunnel for the loading of package members and passengers into the aircraft.

5. An apparatus in accordance with claim 1 including locking means on said package member which cooperates with openings in the floor of the aircraft to lock said package member and the passengers therein in position aboard the aircraft.

6. Apparatus for loading baggage aboard an aircraft from a terminal, comprising:
- a package member having a frame portion on the bottom thereof and a baggage-receiving portion;
- said baggage receiving portion including a center section and a pair of side sections; and
- hinging means for hingeably connecting said side sections on opposite sides of said center section, said side sections having an extended position for receiving baggage in the terminal and after loading in the aircraft, said side sections having a compressed position which they are swung inwardly toward said center section to facilitate handling of the package out of the aircraft, said side sections having tapered shoulder portions so that the cross section of the package member with said side sections in the extended position matches the cross-sectional configuration of the aircraft.

7. An apparatus in accordance with claim 6 in which said frame portion includes: conduit means for receiving a pressure fluid, said conduit means having a plurality of openings therein through which said pressure fluid may escape to exert a lifting force on said package member; and
- means for supplying pressure fluid to said conduit means to lift said package member and the baggage therein.

8. The method of loading passengers aboard a vessel from a terminal comprising the steps of:
- disposing said passengers in seats located in the terminal;
- transporting the seats with the passengers therein between the terminal and the vessel;
- loading the seats aboard the vessel with the passengers in the seats, the seats forming the seating structure on the vessel; and
- supporting the seats with the passengers therein on a film of air during at least a portion of the time in which the seats are transported between the vessel and the terminal.

9. The method of claim 8 including the steps of supporting the seats with the passengers therein on a film of air in said terminal and in said vessel as well as during at least a portion of the time in which the seats are transported between the vessel and the terminal.

10. The method of claim 8 including the step of interconnecting a plurality of the seats to move the seats in groups.

11. The method of claim 8 including the steps of subsequently unloading the seats, with the passengers therein, from the vessel, and transporting the seats, with the passengers therein, to the terminal, for deplaning the passengers.

References Cited

UNITED STATES PATENTS

| | | | |
|---|---|---|---|
| 2,635,031 | 4/1953 | Erhardt | 312—199 X |
| 2,885,242 | 5/1959 | Spatta | 296—28.1 |
| 2,929,655 | 3/1960 | Hurter. | |
| 3,026,071 | 3/1962 | Barcellona et al. | 214—38 X |
| 3,081,886 | 3/1963 | Flexman et al. | 214—1 |
| 3,124,209 | 3/1964 | Flipse. | |
| 3,182,608 | 5/1965 | Mallow | 244—137 X |

FOREIGN PATENTS

| | | |
|---|---|---|
| 874,279 | 8/1961 | Great Britain. |
| 991,721 | 5/1965 | Great Britain. |

OTHER REFERENCES

Flight: Air Freight is a System, p. 648, May 11, 1961.

ROBERT G. SHERIDAN, *Primary Examiner.*

U.S. Cl. X.R.

105—366; 180—125; 214—1, 512, 515, 83.28, 152; 220—1.5, 19; 244—114, 118, 137; 296—228, 64, 65